P. Manny
Harvester Cutter.
No. 15926                  Patented Oct. 21, 1856.
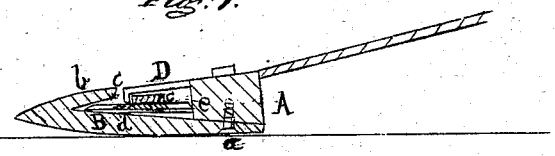
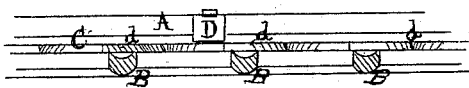
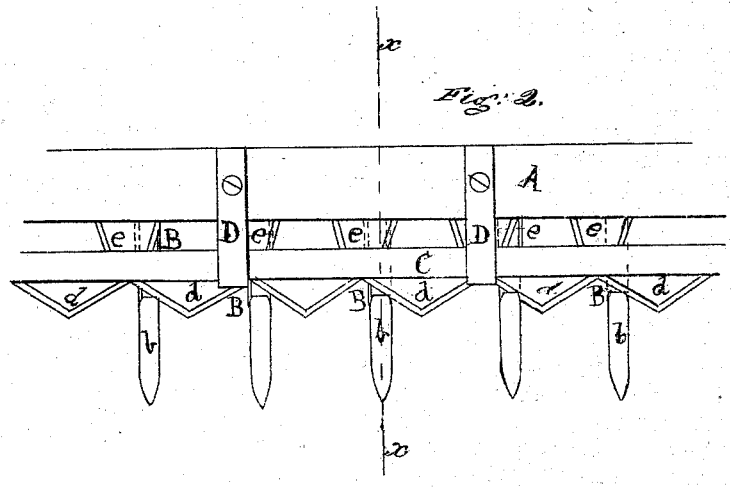

UNITED STATES PATENT OFFICE.

P. MANNY, OF WADDAM'S GROVE, ILLINOIS.

IMPROVEMENT IN SICKLES FOR HARVESTERS.

Specification forming part of Letters Patent No. 15,926, dated October 21, 1856.

*To all whom it may concern:*

Be it known that I, PELLS MANNY, of Waddam's Grove, in the county of Stephenson and State of Illinois, have invented a certain new and useful Improvement in the Sickle or Cutting Devices for Grain and Grass Harvesters, of which the following is a full, clear, and exact description, reference being had to the accompanying drawings, which form part of this specification, and in which—

Figure 1 represents a transverse vertical section of my improvement, $x\ x$, Fig. 2, showing the plane of section; Fig. 2, a plan or top view of the same; and Fig. 3, a longitudinal vertical section thereof, the line $y\ y$, Fig. 1, indicating the plane of section.

My improvement has reference to that description of reciprocating sickle-bar arrangements in which the sickle-bar has cutting or clearing projections extending back of it in addition to the ordinary cutting-teeth in front, for the purpose of preventing the sickle-bar or its race or the fingers over or through which the sickle-teeth work becoming clogged or choked with the cut grass or particles. The arrangements for this purpose have been various, but all of them more or less defective. In some arrangements, which, like mine, have the sickle-bar some little distance in advance of the sickle-stock, the sickle-teeth of serrated form are extended at their rear ends back of the sickle-bar, forming V-shaped spaces and a zigzag cutter, the back teeth or projections of which, while they work in the space separating the sickle-bar and its stock and work over or through the fingers, to remove and cut or clear away the cut grass working backward, exercise the bad effect of urging or pressing such obstructing matter or material backward against the sickle-stock or finger-bar and toward the rear of the fingers, which tendency the travel forward of the machine also induces, and in this manner the sickle-bar's race and that of its back teeth or projections over or between the fingers become clogged or choked in the rear and the sickle cuts imperfectly or is operated with difficulty. Another arrangement, which also takes in the extension of the same section forming the front cutting portion, as in the arrangement just referred to, and which mine does not, has its back cutting-projection, which travels in the space separating the sickle-bar from its stock, arranged centrally back of the sickle-tooth, and presents parallel cutting-edges at right angles to the line of the sickle-bar; but such fail to remove the above objections of clogging by pressure backward of the cut particles by the travel forward of the machine, and such arrangement of the back cutting-projections gives no play of said projections over or through the fingers to clear them by cutting alternately in opposite directions entirely through or over them. Besides these arrangements, there are many others which are equally defective in practice; but I do not deem it necessary to specify them, nor yet allude in detail to those sickle-bar arrangements which employ variously-shaped projections on the back of the sickle for clearing off gummy substances, &c., adhering to or working onto the stock, by said projections acting as scrapers on the top surface of the stock or otherwise equivalently operating, my improvement not having the same object in view, and the arrangements already described will be sufficient to elucidate the difference and advantages of my invention by the following description of the latter:

The part marked A in the accompanying drawings represents the finger-bar of a harvester, and B the fingers, which are or may be attached to the under side of the bar by screws or bolts $a$, as shown clearly in Fig. 1. The front ends of the fingers are pointed in the usual way, and the front parts of the fingers are provided with lips $b$, which project backward over the upper parts of the fingers, forming V-shaped recesses $c$, as shown in Fig. 1. The upper surfaces of the fingers are slightly beveled or inclined downward from the recesses $c$ to their back ends, and the upper surfaces of the fingers are or may be grooved or made longitudinally of concave form, as shown in Fig. 3.

To the under surface of the cutter-bar C the sickle teeth or cutters $d$ are or may be attached in any desired manner, the whole forming a serrated cutter or sickle, the teeth $d$ of which are represented as projecting a suitable distance in front of the bar C, and the outer ends or points of said teeth into the recesses $c$ of the fingers, the teeth resting on and working over the upper surfaces of the fingers by the reciprocating motion given the cutter-bar in the ordinary or any proper manner.

Hooked bars D may be attached to the finger-bar A to serve as guides to the cutter-bar, as represented in Figs. 1 and 3.

To the under side of the cutter-bar C back projecting teeth, cutters, or clearers, e, are attached, whose race during the reciprocating action of the cutter-bar is in the space which separates the front edge of the finger-bar and back edge of the cutter-bar, and these back projecting teeth, e, are arranged intermediate of the front cutters, d, though separate and distinct from them and lying back, so that in the reciprocating action of the cutter-bar the said back teeth, e, play clear over the backs of the top surfaces of the fingers immediately in advance of the finger-bar and between the sickle and finger-bar, as described, cutting or clearing away alternately in opposite directions over and beyond the fingers. These back teeth, e, are not extensions of the sections which form the front cutting-teeth, d, for their shape and relative arrangement make it inconvenient or impossible to construct them in that manner; but, as represented, they are distinct V-shaped projections, fitting, as it were, at their points between the front cutting-teeth, d, at their base and gradually spreading or widening backward, their back and broadest ends bearing against or working close up to the front side of the finger-bar A, and in this way the said back teeth, e, form a serrated cutter operating in the space which separates the sickle and finger-bars back of the front cutters, though intermediate to them, to play in the ordinary run of the sickle, alternately in opposite directions entirely over and across the backs of the fingers, and cutting or clearing away from the finger-bar or frontward in like manner to the front cutters, so that the cut particles working down the fingers toward the back are effectually cleared away by the back cutters or teeth, e, urging said particles forward, counteracting entirely the tendency to produce lodgment back, which the travel forward of the machine induces, and preventing all clogging or choking on the fingers and between the finger-bar and sickle, as aimed at by the arrangements I have before referred to, but never before so perfectly attained, and my arrangement being devoid of all objections, as previously stated.

Instead of the back teeth, e, pointing or arranged to clear away or cut laterally forward over the fingers, as described, being separate projections attached to the cutter-bar C, they may be attached to or formed out of another bar, which may be connected with the cutter-bar, to reciprocate with it or be separately and similarly driven to operate in unison with it and the front cutting-edge or cutters, d, of it, in manner described, the effect being similar so long as the back teeth, e, are arranged to cut or press laterally forward and reciprocate over the backs of the fingers while the front cutter or cutters are also reciprocating to effect the cut.

I do not claim the employment of back cutting-teeth on the cutter-bar and operating between the cutter and finger-bars and over the fingers, whether the same be formed by the extension of the front cutters or be separately attached at their base ends to the cutter-bar; but What I do claim as an improvement on the cutting apparatus patented to Henry Green, March 21, 1854, and desire to secure by Letters Patent, is—

The arrangement at the back of the cutter-bar C, and for reciprocating operation with it, of a back set of cutters or clearers, e, between the finger and cutter bars, when said teeth e are shaped and arranged to cut laterally forward, alternately in opposite directions, through or over the backs of the fingers for joint action with the front cutter or cutters, d, for the better clearance of the fingers and cutter-bar race, essentially as set forth.

In testimony whereof I have hereunto subscribed my name.

P. MANNY.

Witnesses:
J. F. CALLAN,
A. GREGORY.